(12) United States Patent
Rizzuto et al.

(10) Patent No.: US 12,053,116 B2
(45) Date of Patent: Aug. 6, 2024

(54) CLEANING SYSTEM AND METHOD FOR BEVERAGE APPLIANCE

(71) Applicants: Leandro P. Rizzuto, Sheridan, WY (US); Joseph J. Laskowski, Derby, CT (US)

(72) Inventors: Leandro P. Rizzuto, Sheridan, WY (US); Joseph J. Laskowski, Derby, CT (US)

(73) Assignee: CONAIR LLC, Stamford, CT (US)

( * ) Notice: Subject to any disclaimer, the term of this patent is extended or adjusted under 35 U.S.C. 154(b) by 705 days.

(21) Appl. No.: 17/197,400

(22) Filed: Mar. 10, 2021

(65) Prior Publication Data

US 2021/0196076 A1 Jul. 1, 2021

Related U.S. Application Data

(62) Division of application No. 14/659,927, filed on Mar. 17, 2015, now abandoned, which is a division of application No. 13/551,007, filed on Jul. 17, 2012, now abandoned.

(60) Provisional application No. 61/509,298, filed on Jul. 19, 2011.

(51) Int. Cl.
*A47J 31/44* (2006.01)
*A47J 31/46* (2006.01)
*A47J 31/60* (2006.01)

(52) U.S. Cl.
CPC ......... *A47J 31/4489* (2013.01); *A47J 31/46* (2013.01); *A47J 31/60* (2013.01)

(58) Field of Classification Search
CPC .... A47J 31/4485; A47J 31/46; A47J 31/4489; A47J 31/60
See application file for complete search history.

(56) References Cited

U.S. PATENT DOCUMENTS

| 5,207,148 | A | * | 5/1993 | Anderson | A47J 31/525 99/290 |
| 5,473,972 | A | * | 12/1995 | Rizzuto | A47J 31/4403 99/290 |
| 2003/0232115 | A1 | * | 12/2003 | Eckenhausen | A47J 31/461 426/477 |
| 2011/0005407 | A1 | * | 1/2011 | Reyhanloo | A47J 31/60 134/22.12 |

* cited by examiner

*Primary Examiner* — Thien S Tran
(74) *Attorney, Agent, or Firm* — Grogan, Tuccillo & Vanderleeden LLP

(57) ABSTRACT

The beverage appliance of the present invention includes a venturi having a steam inlet and a milk inlet. The steam inlet and milk inlet each include a solenoid valve configurable between an open state and a closed state. The solenoid valves are electrically coupled to a processor and are controllable through first and second switches. In operation, upon activation of the first switch, the solenoid valves are controlled to their open states to deliver milk and steam to the venturi to produce frothed milk. When a desired amount of frothed milk has been dispensed, the user deactivates the first switch and the processor controls only the milk inlet solenoid valve to its closed state. The steam inlet solenoid valve remains in its open state for a predetermined amount of time such that a burst of steam only is forced through the venturi and distribution lines to purge them of milk.

6 Claims, 9 Drawing Sheets

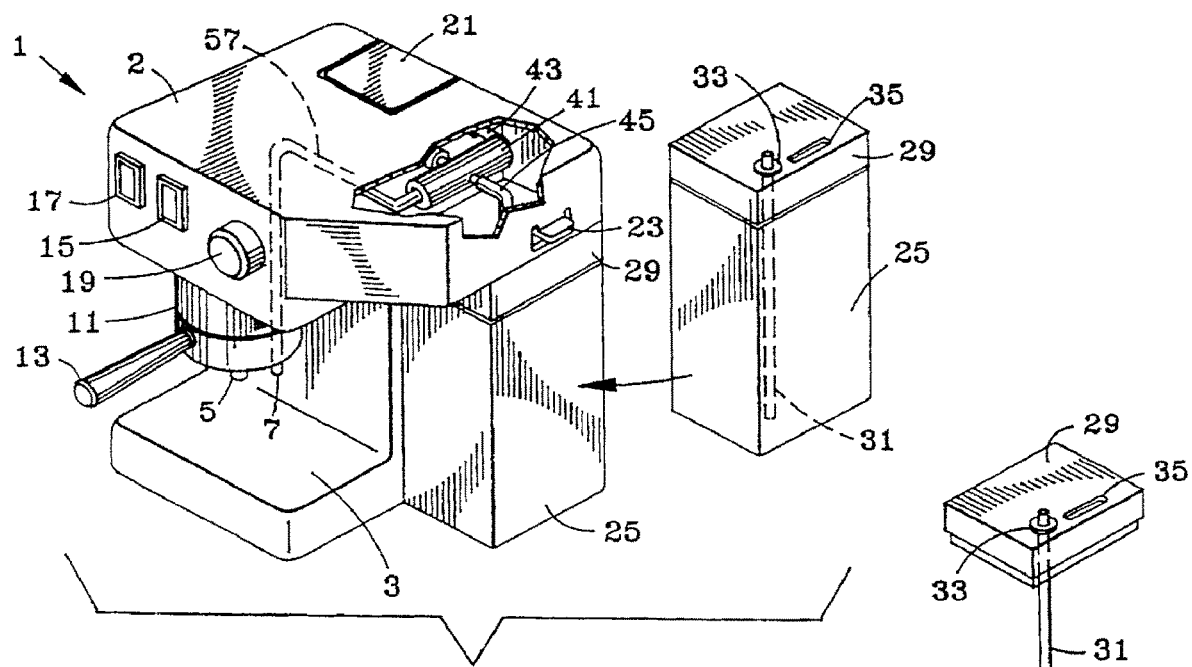
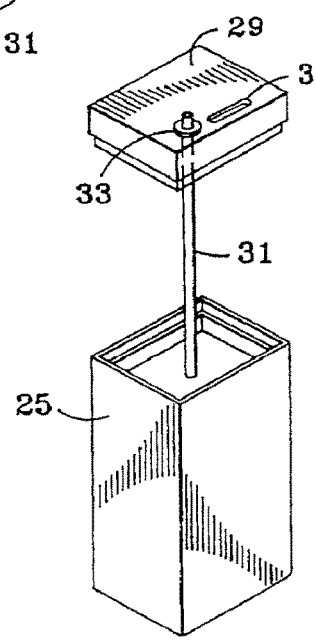
FIG. 1
FIG. 2
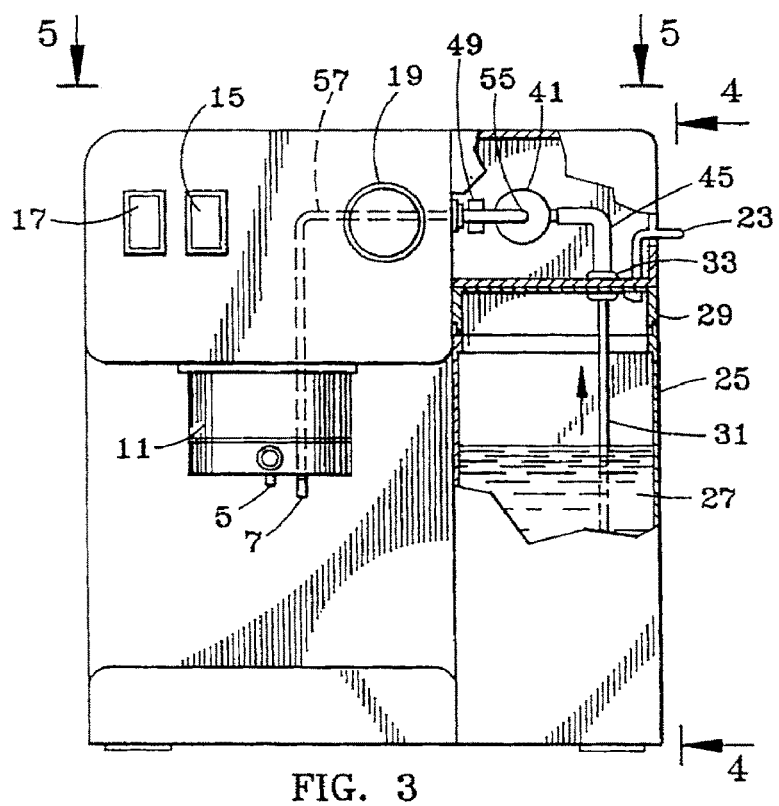
FIG. 3

CLEANING SYSTEM AND METHOD FOR BEVERAGE APPLIANCE

CROSS-REFERENCE TO RELATED APPLICATIONS

This application is a divisional application of U.S. Utility application Ser. No. 14/659,927 filed Mar. 17, 2015 which is a divisional application of U.S. Utility application Ser. No. 13/551,007, filed on Jul. 17, 2012, which claims the benefit of U.S. Provisional Application Ser. No. 61/509,298, filed on Jul. 19, 2011, all of which are herein incorporated by reference in their entireties.

FIELD OF THE INVENTION

This invention relates to the field of beverage appliances, and, in particular, to a cappuccino coffee maker having an automatic cleaning feature.

BACKGROUND OF THE INVENTION

Beverage appliances, such as cappuccino makers have, in the past, had problems in their use: the milk delivery lines and other components through which milk is routed in the making of a beverage are prone to contamination and bacteria growth unless they are periodically cleaned/flushed. Existing machines, however, often rely on a user to remember to periodically clean the machine, and require cumbersome manual steps to effect such cleaning. In addition, the design of existing machines requires at least partial disassembly in order to clean the milk delivery lines and other components that are contacted by the milk. The present invention solves these problems.

SUMMARY OF THE INVENTION

The beverage appliance of the present invention includes a venturi having a steam inlet and a milk inlet. The steam inlet and milk inlet each include a solenoid valve configurable between an open state and a closed state. The solenoid valves are electrically coupled to a processor and are controllable through first and second switches. In operation, upon activation of the first switch, the processor sends a signal to control both solenoid valves to their open states, simultaneously, to deliver milk and steam, respectively, to the venturi to produce frothed milk. When a desired amount of frothed milk has been dispensed into a user's cup, the user deactivates the first switch and the processor controls only the milk inlet solenoid valve to its closed state. The steam inlet solenoid valve remains in its open state for a predetermined amount of time such that a burst of steam only is forced through the venturi and distribution lines to purge them of milk.

BRIEF DESCRIPTION OF THE DRAWINGS

FIG. 1 is a perspective view of the cappuccino maker, and shows the removable container both in its installed position and removed from the unit.

FIG. 2 is a perspective view of the milk container, with the top partially removed.

FIG. 3 is a front elevation of our cappuccino maker, partly broken away.

DETAILED DESCRIPTION OF THE PREFERRED EMBODIMENTS

Figure 4:
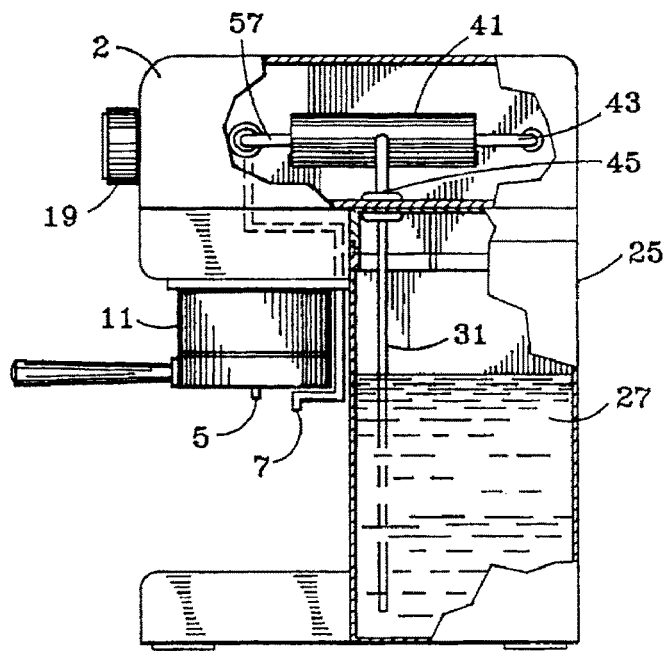
FIG. 4 is a side elevation, partially broken away, taken on line 4-4 of FIG. 3.
Figure 5:
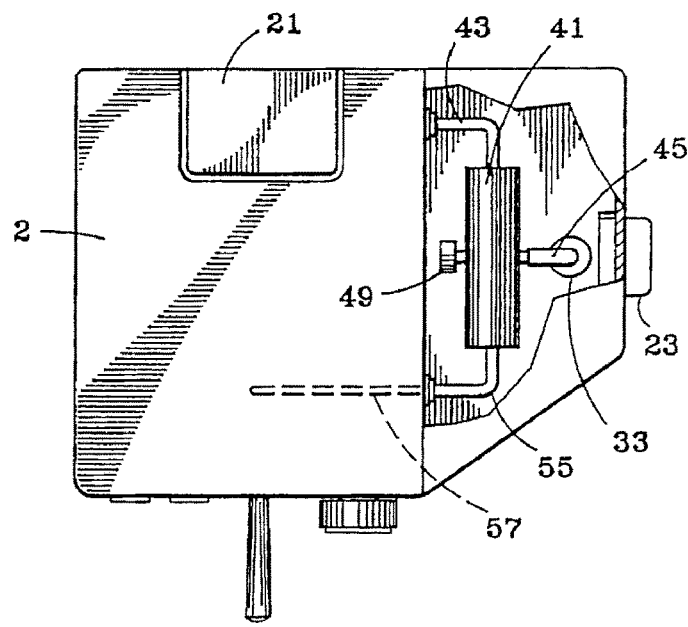
FIG. 5 is a top plan view, partially broken away, taken on line 4-4 of FIG. 3.
Figure 6:
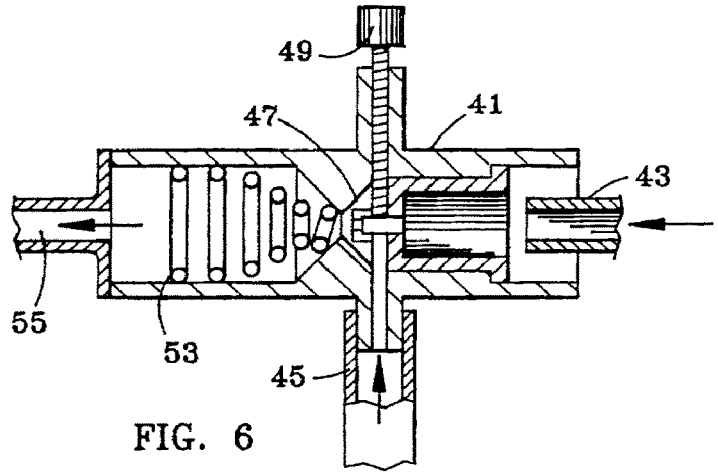
FIG. 6 is a vertical section, taken through the venturi, showing how the hot steam and milk are brought together and mixed.

The cappuccino coffee maker 1 according to the present invention includes the usual housing 2 and dispensing area 3. The dispensing area includes two proximate dispensing spouts, a coffee (espresso) spout 5 and a steamed milk spout 7. The two spouts are close enough together so that both can be directed to a cappuccino cup at the same time. The unit also includes a coffee basket 11 with handle 13, an on-off switch 15 with indicator light 17, a steam adjustment knob 19 and a water inlet 21. These work in the customary way. In an embodiment, such as that described below in connection with FIG. 8, the steam adjustment known 19 may be a first switch.

The cappuccino coffee maker 1 also includes the usual elements found in such a unit: a water supply coupled with heating means to produce steam; means to run the steam through ground coffee to produce espresso coffee; an outlet for the coffee; and means to run steam through milk to froth it. It differs, however, in that, inter alia, the milk supply can be removed from the unit when desired to store the milk. Also, in our modification, the steam line to the milk includes a make and break connection, with self-closing valves, so that the milk frothing unit can also be removed from the cappuccino maker.

The cappuccino coffee maker 1 includes a milk container 25 carrying milk 27. Container 25 is secured to housing 2 by latch 23 and the latch-receiving slot 35 on container top 29. A milk delivery tube 31 is carried by top 29 and extends down into container 25. It carries a seal 33 at its upper end. The tube 31 is to deliver milk to a venturi frothing unit.

A venturi 41 is carried by the housing 2 and mounted just above milk container 25. It acts as a milk-frothing unit and has a steam inlet 43, to receive hot steam from the housing. The steam enters one end of the venturi 41, passes through a narrow aspirating portion 47, and leaves past a conical spring 53 (to assist in frothing the milk) to frothed milk outlet 55. Milk delivery tube 31 passes through spring-loaded seal 33 to its connection with milk inlet 45 on venturi 41. This leads milk to the narrow portion 47 of the venturi, the narrow portion acting as an aspirator as is customary with venturis. The milk mixes with steam in the narrow portion, frothing it, and the milk and steam pass towards frothed milk outlet 55. Conical spring 53 is encountered during that passage, which serves to further froth the milk. If desired, a froth control, such as a needle valve, can be positioned in the narrow portion 47 of venturi 41, to control the rate of flow of steam through the venturi.

The frothed milk goes from outlet 55 to and through tube 57, which leads to milk spout 7. This milk spout is positioned proximate to coffee spout 5, thus providing convenience in serving the cappuccino. Preferably spouts 5 and 7 are close enough together so that both coffee and steamed milk can be delivered to a cup without moving the cup.

When a user is finished using the cappuccino maker 1, the milk container 25 can be removed from the unit by releasing latch 23. The container can them be placed in a refrigerator to preserve the milk. At the next time of use, the container can again be attached to the unit, with milk take up tube 31 connecting to the venturi milk inlet through seal 33. In the interim, the milk has been preserved from spoiling.

Figure 7:
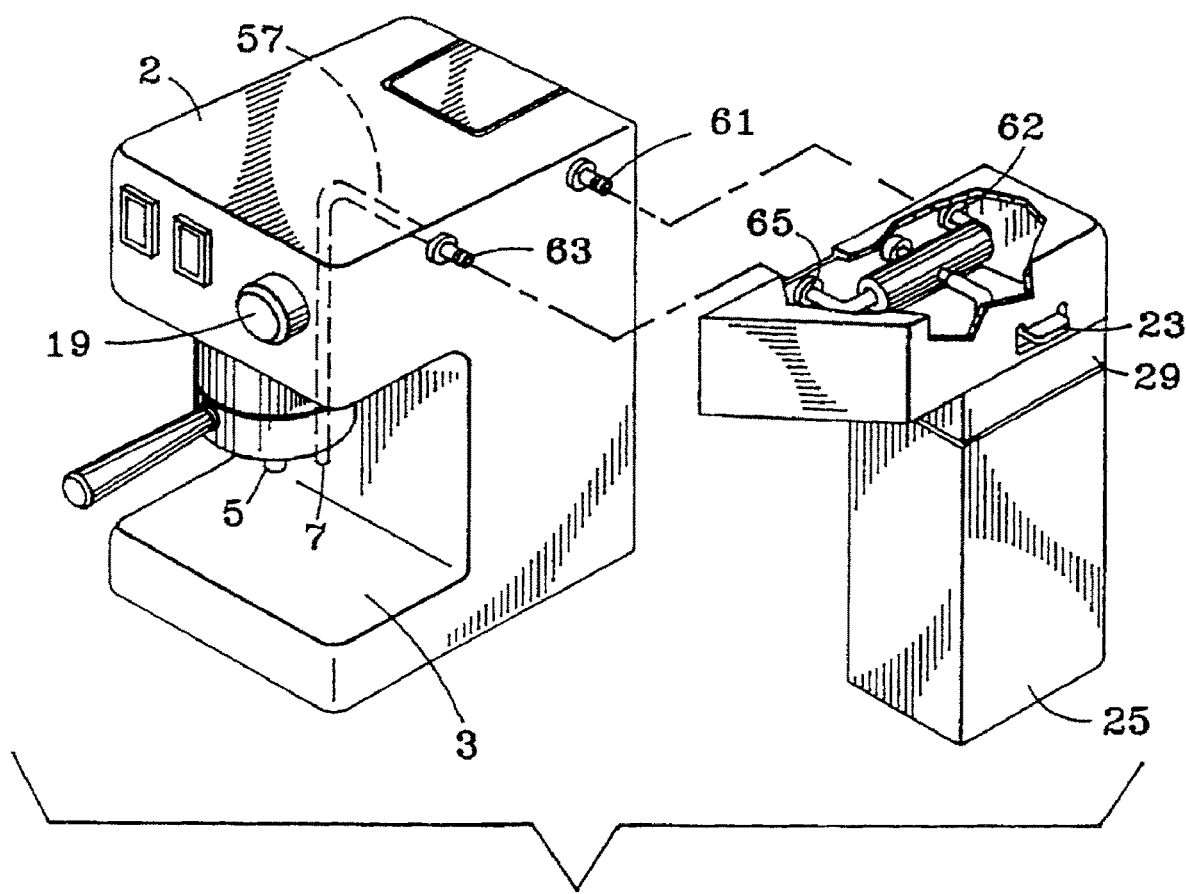
FIG. 7 is an exploded perspective view of a modification of our invention in which the venturi frothing unit, together with the milk container, are detachable from the cappuccino maker.

In a modification of our invention seen in FIG. 7, the milk container 25 and the venturi unit are detachable as a unit. In this instance, steam line 61 in the housing is connected to steam connection 62 on the venturi system; and frothed milk connector 63 in the housing is connected to milk connection 65 on the venturi system. These connections are preferably of the quick-acting and self-closing type.

It will be appreciated that the present invention, particularly as shown in FIG. 7, can be used to modify existing espresso makers so that they can make cappuccino. This would be accomplished by providing means for the espresso maker steam line to also be used to steam and froth milk, and by providing means by which this steam can be interconnected to a venturi frothing unit.

Figure 8:
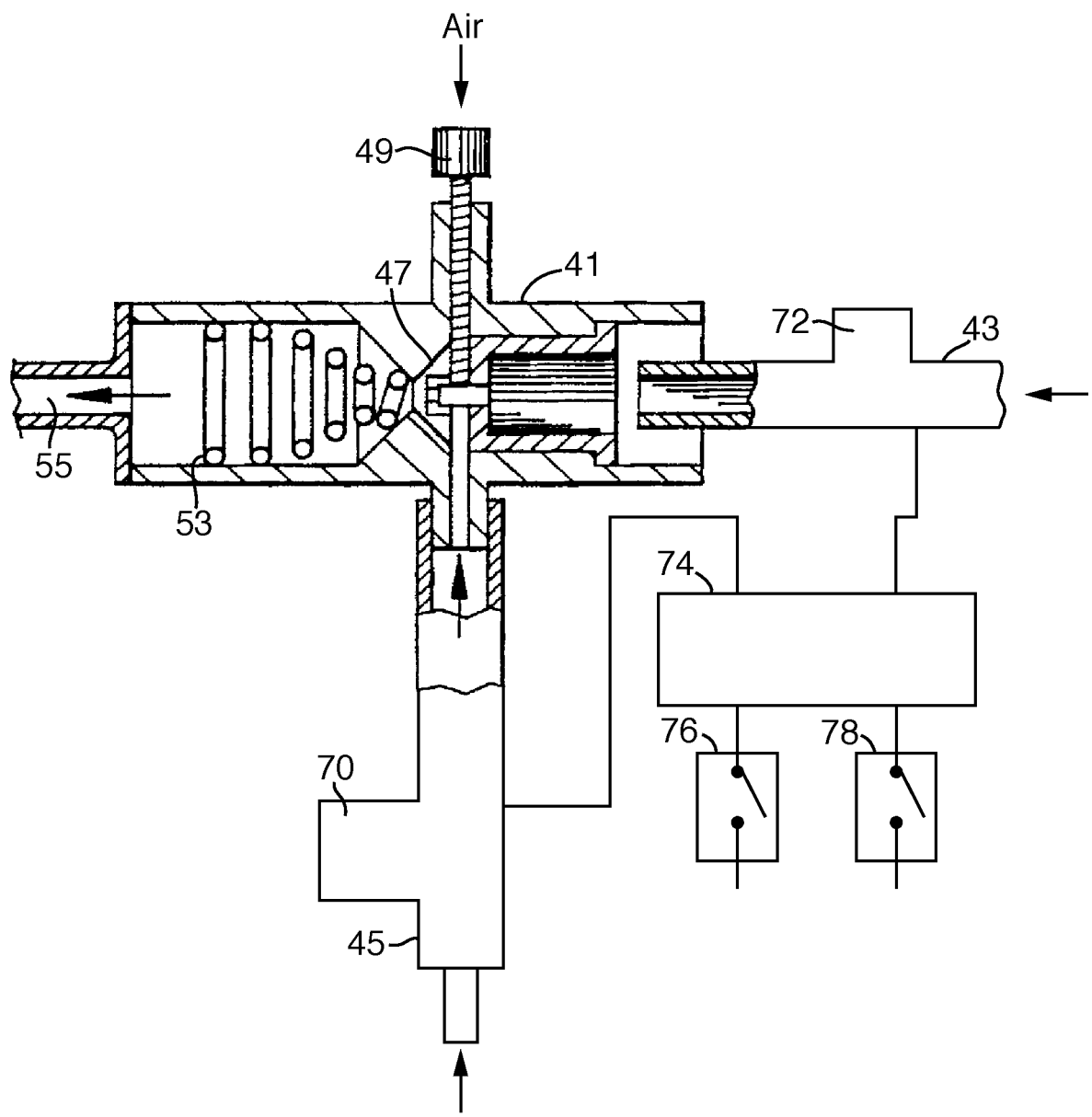
FIG. 8 is a schematic, cross-sectional view of a venturi and automatic cleaning system for use with the beverage appliance of FIG. 1, in accordance with an embodiment of the present invention.

Referring now to FIG. 8, the cappuccino coffee maker 1 as described in connection with FIGS. 1-6, may also include an automatic cleaning system for cleaning/flushing the components of the coffee maker 1 that come in contact with milk. As shown therein, in an embodiment, milk inlet 45 of the venturi 41 and the steam inlet 43 of the venturi 41 are configured with first and second solenoid valves 70, 72, respectively. The solenoid valves 70, 72 may be referred to as a milk inlet solenoid valve 70 and a steam inlet solenoid valve 72. The solenoid valves 70, 72 may be generalpurpose solenoid valves for food and beverage applications, such as those known in the art, although other type of valves may also be used without departing from the broader aspects of the present invention.

The milk inlet solenoid valve 70 and the steam inlet solenoid valve 72 are each in electrical communication with a processor 74 contained within the housing 2 of the cappuccino coffee maker 1. The processor 74 is configured to control the milk inlet solenoid valve 70 between a first, open position, in which milk is permitted to pass from the milk inlet 45 through the milk inlet solenoid valve 70 and through the outlet 55, and a second, closed position, in which milk is prevented from passing through the milk inlet solenoid valve 70. Similarly, the processor 74 is configured to control the steam inlet solenoid valve 72 between a first, open position, in which steam is permitted to pass form the steam inlet 43 through the steam inlet solenoid valve 72 and through the outlet 55, and a second, closed position, in which steam is prevented from passing through the steam inlet solenoid valve 72.

As further shown in FIG. 8, the processor is electrically coupled to two switches, a first switch 76 and a second switch 78. During operation, once coffee is brewed and dispensed into a users cup, a user may activate the first switch 76 from a control panel/user interface to control the dispensing of frothed milk. In particular, upon activation of the first switch 76 by a user, a signal from the processor 74 controls both the milk inlet solenoid valve 70 and the steam inlet solenoid valve 72 to their respective open positions, simultaneously. Milk and steam are then permitted to enter the venturi 41 where the milk mixes with steam, frothing it, and the milk and steam pass towards frothed milk outlet 55. Conical spring 53 is encountered during that passage, which serves to further froth the milk. The frothed milk goes from outlet 55 to and through tube 57, which leads to milk spout 7.

When the desired amount of frothed milk is dispensed into the user's cup, the first switch 76 is deactivated by the user, and a signal from the processor 74 closes the milk inlet solenoid valve 70, thereby preventing milk from entering the venturi 41 and allowing steam only to enter the venturi 41 for a predetermined amount of time, e.g., a few seconds, to purge the venturi 41, outlet 55, milk spout 7, etc. of any residual milk. After the predetermined amount of time has passed and the venturi 41, outlet 55, milk spout 7, etc. have been cleaned by the burst of steam, the processor 74 sends a signal to close the steam inlet solenoid valve 72. In an embodiment, when not in use, both the milk inlet solenoid valve 70 and the steam inlet solenoid valve 72 are in their closed states.

Importantly, when the user deactivates the first switch 76 to stop the flow of frothed milk, the processor 74 retains the steam inlet solenoid valve 72 in its open position for a predetermined period of time so that a burst of steam is automatically delivered to the venturi 41 and milk spout 7 to clean these system components. As will be readily appreciated, this automatic burst-of-steam cleaning feature ensures that residual milk is removed from the venturi 41 and distribution system to prevent milk line contamination and the growth of bacteria. In contrast to existing cappuccino coffee makers, the present invention ensures that the milk distribution system (including the venturi 41, milk spout 7, etc.) is automatically cleaned every time the milk delivery function is utilized, i.e., when a user activates the first switch 76 to initiate the flow of milk. That is, upon deactivation of the first switch 76, the burst-of-steam cleaning feature is automatically initiated to purge the system of residual milk. In this respect, the burst-of-steam cleaning feature is transparent to a user and requires no manual activation or manual cleaning. Accordingly, it is not necessary for a user to remember to manually clean the milk delivery system; it is done automatically without any extra steps by the user.

In an embodiment, if the coffee maker 1 is only utilized to brew a cup of black coffee or espresso, i.e., where no milk is being drawn from the milk container 25, the burst-of-steam cleaning feature need not be utilized.

Another important feature of the present invention is that with the addition of the second switch 78, the steam inlet solenoid valve 72 may operate independently of the milk inlet solenoid valve 70. For example, in an embodiment, if the second switch 78 is activated by the user, the processor 74 sends a signal to the steam inlet solenoid valve 72 to control the steam inlet solenoid valve 72 to its open position. As a result, steam only enters the venturi 41 and milk spout 7, which may be used for preheating the beverage container or heating/frothing other liquids that are not contained in the milk container 25. Moreover, the second switch 78 may be activated by user to further clean the venturi 41, outlet 55, spout 7 and other distribution components, as desired, such as to ensure that the system is clean after longer periods of down-time.

As described above, the coffee maker 1 of the present invention includes a removable milk container 25. As will be readily appreciated, the removable milk container allows a user to store the milk in a refrigerator or the like to maintain freshness and inhibit the growth of bacteria. While substantially all of the components that come in contact with milk are contained within the housing 2 of the coffee maker 1 and thus may be cleaned using the burst-of-steam automatic cleaning system described above, the other components that come in contact with milk, such as tube 31 and seal 33 are housed in the removable milk container 25 which may be removed from the coffee maker 1 and refrigerated to inhibit the growth of bacteria thereon. When the time does come to clean the milk container 25, seal 33 and tube 31 may be easily cleaned therewith in the customary manner.

While the burst-of-steam, automatic cleaning system has been described in connection with a cappuccino coffee maker, it is not intended to be so limited in this regard. In particular, it is intended that the automatic cleaning system may be used in combination with any type of beverage appliance device or system in which purging or cleaning of liquid distribution lines, such as for delivering milk or other liquids, is desired.

Figure 9:
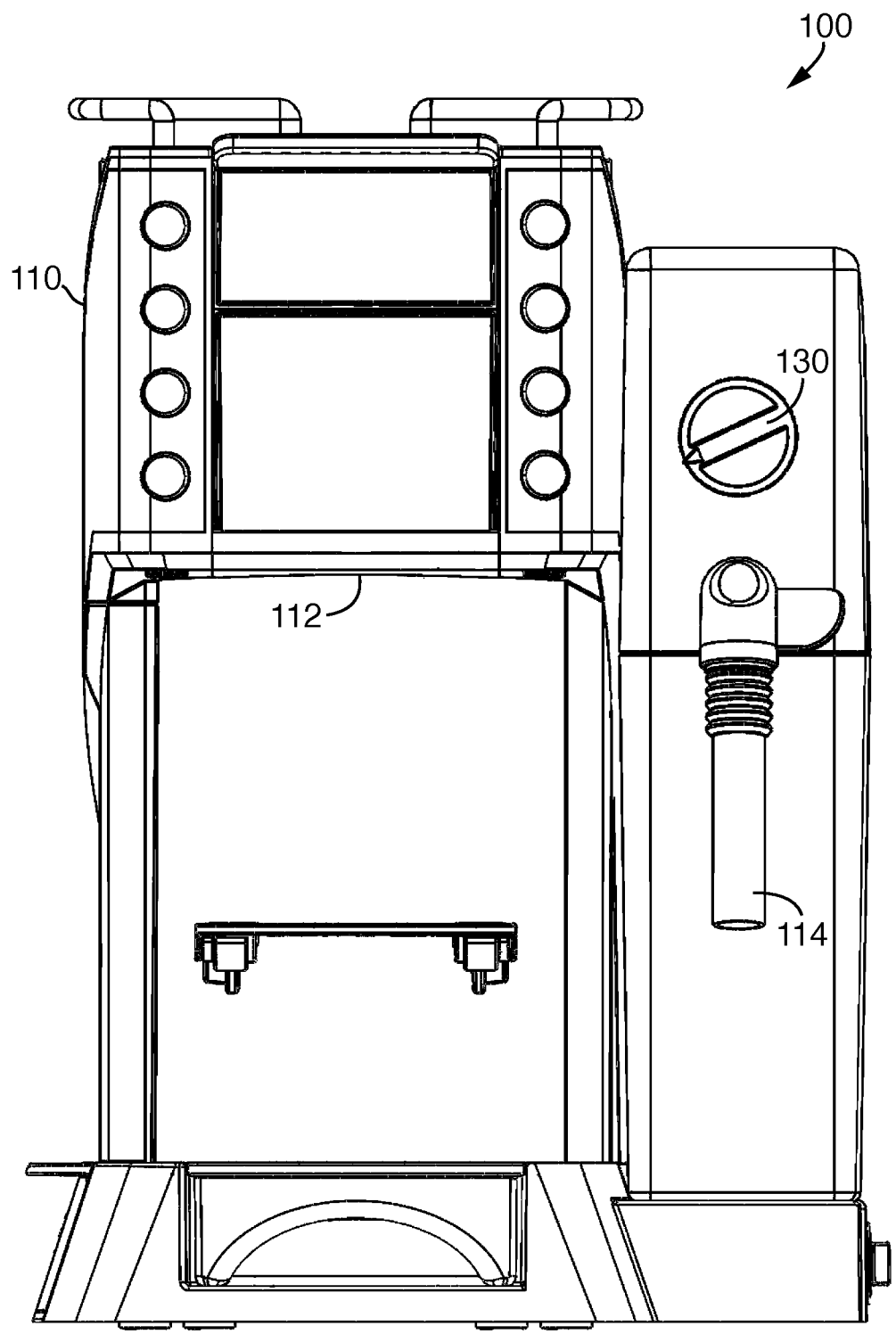
FIG. 9 is a front, elevational view of a brewed beverage appliance having an automatic cleaning system in accordance with an embodiment of the present invention.
Figure 10:
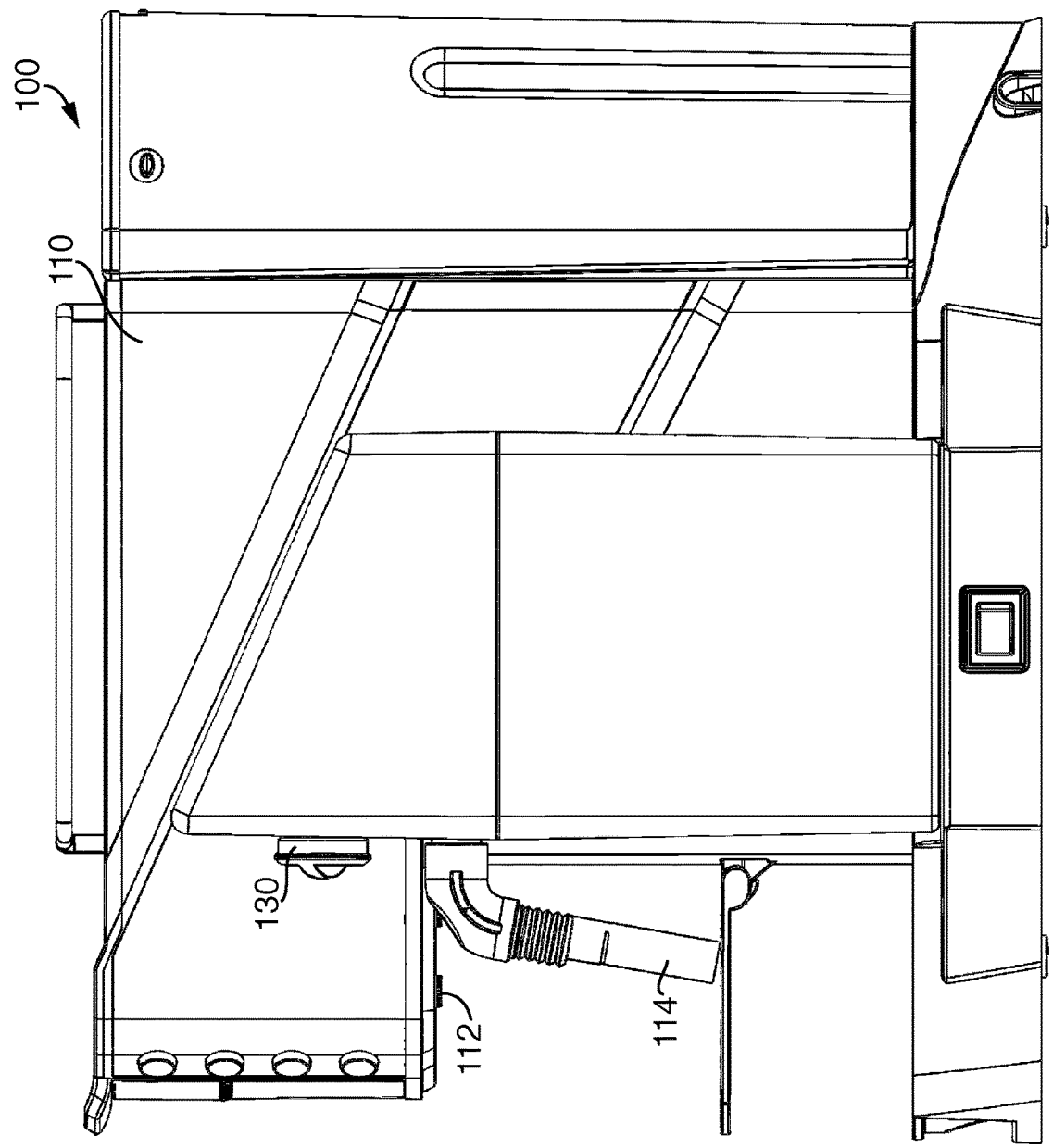
FIG. 10 is a right-side, elevational view of the brewed beverage appliance of FIG. 9.

For example, as shown in FIGS. 9-13, the automatic cleaning system may utilized with any type of brewed beverage appliance known in the art, such as a coffee maker 100. As shown therein, the coffee maker 100 includes a housing having a coffee dispensing spout 112 and a frothed milk dispensing spout 114. As shown in FIG. 9, the milk dispensing spout 114 may be adjacent to and separate from the coffee dispensing spout 112. In an embodiment, the coffee maker 100 may be of the single serve type in which heated water is passed through a filter cup 116 filled with ground coffee.

Figure 11:
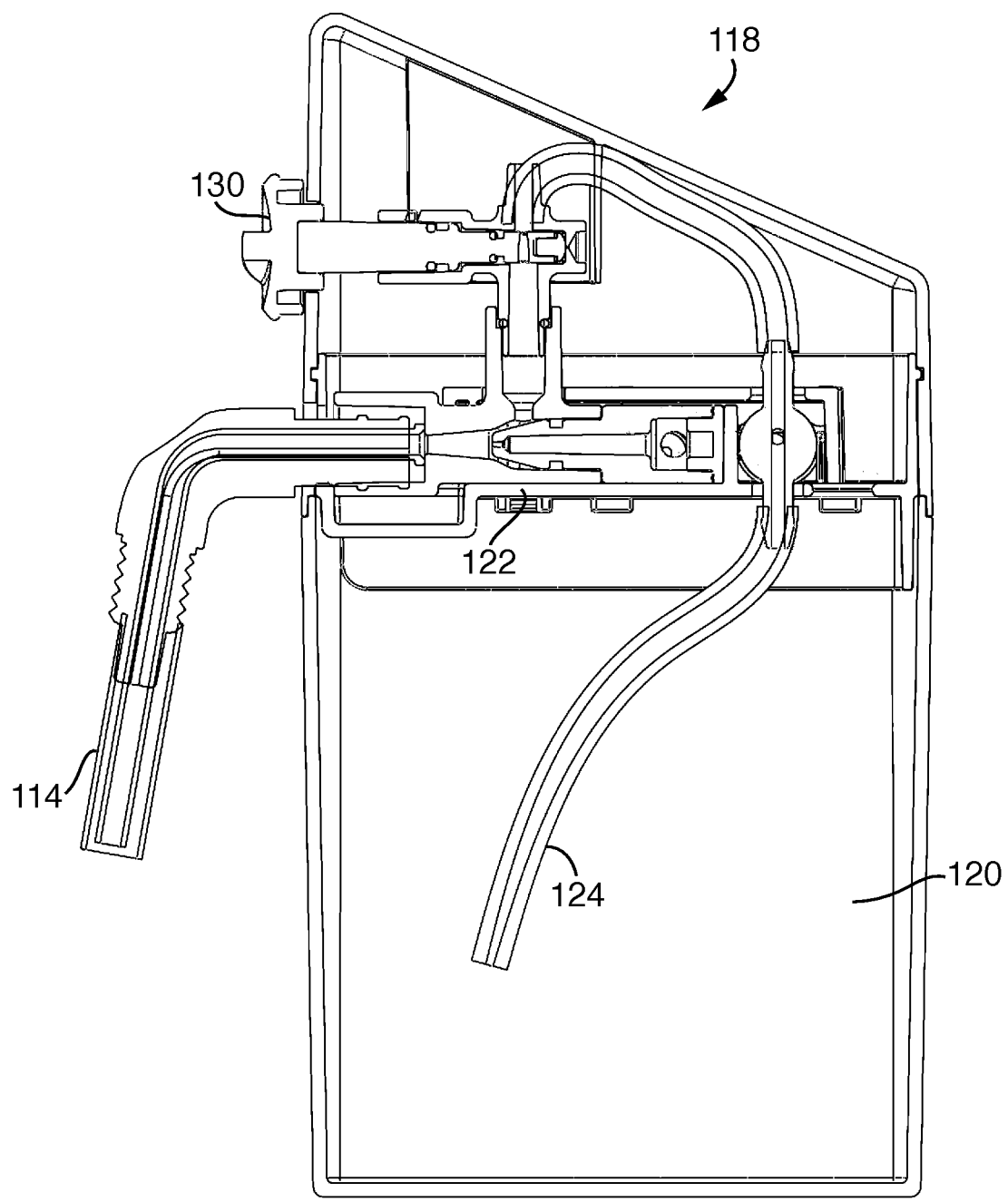
FIG. 11 is an enlarged, right-side view of a milk frothing unit and automatic cleaning system of the brewed beverage appliance of FIG. 9.
Figure 12:
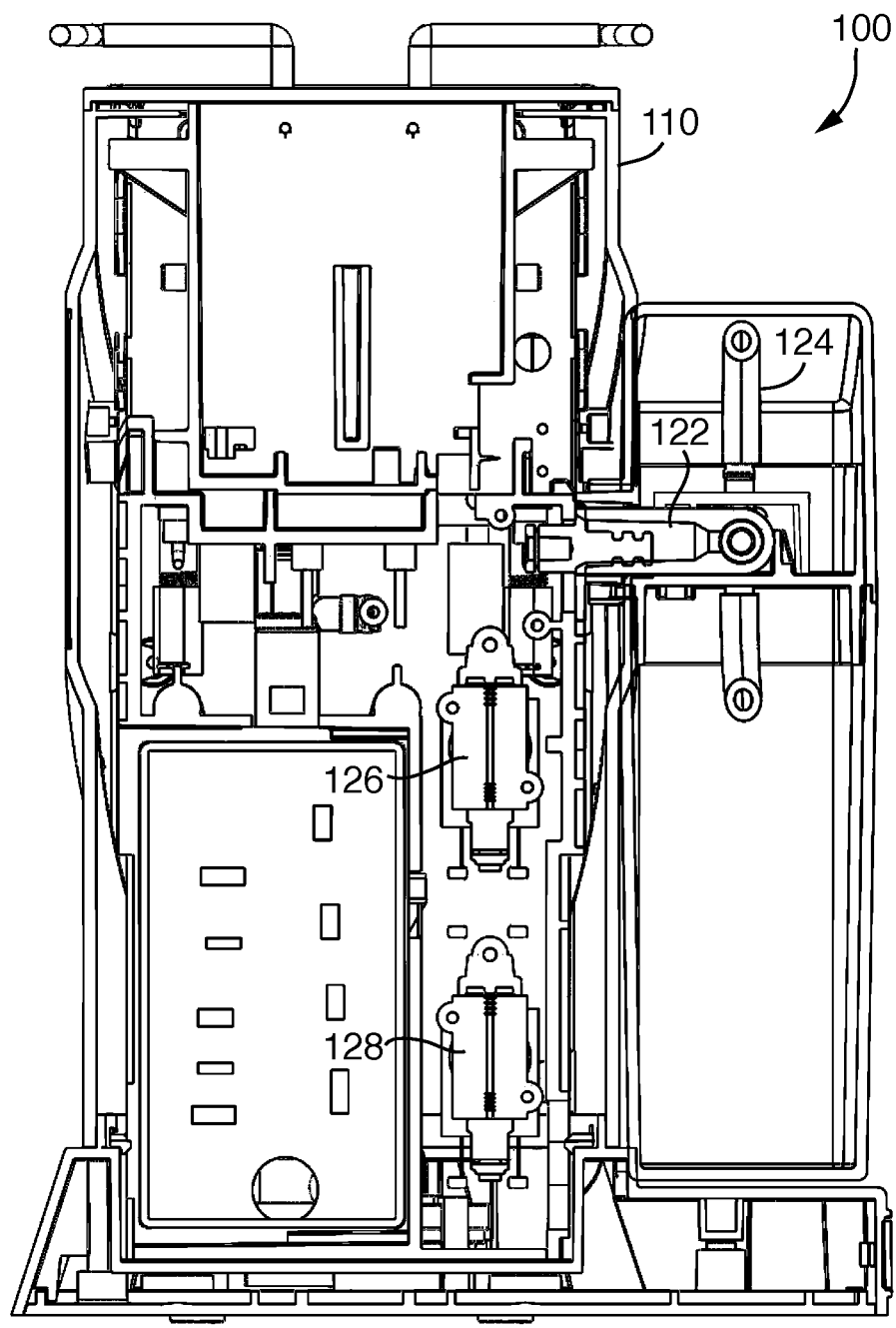
FIG. 12 is cross-sectional, front view of the brewed beverage appliance of FIG. 9.
Figure 13:
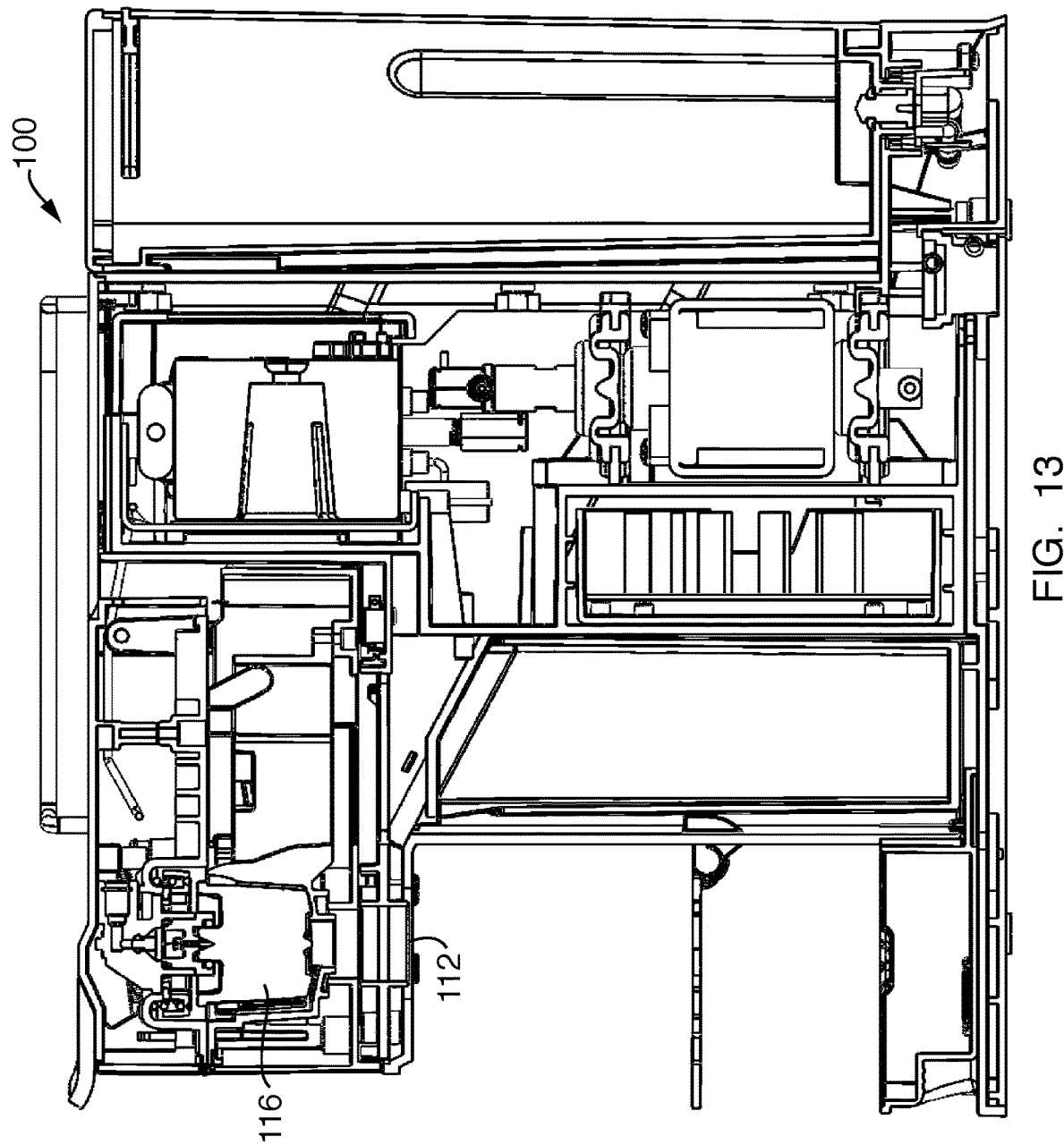
FIG. 13 is a cross-section, right-side view of the brewed beverage appliance of FIG. 9.

As best shown in FIG. 11, the coffee maker 100 may include a milk frothing unit 118 of the type hereinbefore described. In particular, the milk frothing unit 118 may include a milk reservoir 120 and a steam source (not shown) in fluid communication with a venturi 122. An outlet of the venturi 122 is in fluid communication with the dispensing spout 114 to dispense frothed milk, milk, or steam, as discussed above, into a user's cup. As shown therein, a milk tube 124 extends from the milk reservoir 120 to an inlet of the venturi 122. As described above, a pair of solenoid valves 126, 128 may control the flow of milk and steam, respectively, to the venturi 122. As further described above, these solenoid valves 126, 128 are in electrical communication with a processor (not shown). A pair of switches or knobs may also be electrically connected to the processor to allow a user to manually control a flow of milk and steam to the venturi 122 and out of the milk dispensing spout 114. For example, the coffee maker may have a frothed milk dispensing knob 130 accessible from the front of the device.

In use, a user may brew a beverage under dispensing spout 112. If frothed milk is desired, a user may then move his/her cup under the frothed milk dispensing spout 114 and activate knob 130. Activation of the knob 130 signals the processor to control the solenoid valves 126, 128 to their open positions so that both milk and steam enter the venturi 122 to produce frothed milk that is dispensed into a user's cup through dispensing spout 112. When a desired amount of frothed milk is dispensed, a user releases the knob 130. In an embodiment, the processor operates according to a control algorithm such that the solenoid valve regulating the flow of milk to the venturi 122 is controlled to its closed position upon release of the knob/switch 130, while the solenoid valve regulating the flow of steam to the venturi 122 is maintained, for a predetermined amount of time, in the open position to allow a burst of steam to travel through the milk tube 124, venturi 122 and spout 114 to cleanse/ sterilize such components. Importantly, in this manner, the components of the beverage appliance 100 that come in contact with milk are automatically cleansed/sterilized every time frothed milk is dispensed.

In an embodiment, a user may select a "steam only" mode, for example, by pressing a button, and activate the knob 130 to initiate a steam-only burst to further purge the system or to heat/pre-heat a user's beverage in the manner described above.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A brewed beverage appliance, comprising:
   a housing;
   a steam source;
   a milk reservoir;
   a brewed beverage dispensing spout;
   a frothed milk dispensing spout;
   a milk frothing unit fluidly coupled to said frothed milk dispensing spout, said milk frothing unit including a venturi having a venturi body with a steam inlet end for receiving steam from said steam source within said housing via a steam line and a milk inlet opening for receiving milk from said milk reservoir via a milk delivery tube;
   a first valve in fluid communication with said milk delivery tube upstream of said milk inlet opening in said venturi body, wherein said first valve is configured to control a flow of milk through said milk inlet opening in said venturi body, and wherein said first valve is controllable between an open state and a closed state to control a flow of milk to said milk frothing unit, said first valve controlling an ingress of the milk through said milk inlet opening in said venturi body when in said open state;
   a second valve in fluid communication with the steam line upstream of said steam inlet end in said venturi body, wherein said second valve is configured to control a flow of steam through said steam inlet end in said venturi body and is controllable between an open state and a closed state to control a flow of steam to said milk frothing unit, said second valve controlling an ingress of steam through said steam inlet end in said venturi body when in said open state;
   a processor electrically coupled to said first and second valves, said processor configured to control said first and second valves between said open and closed states automatically at an end of a brewing cycle to purge milk contacting surfaces of said brewed beverage appliance;

a first switch electrically coupled to said processor and configured to control said first valve between said open and said closed state, said first switch being manually actuatable to manually initiate a dispensing of milk only through said milk frothing unit and out of said frothed milk dispensing spout; and a second switch electrically coupled to said processor and configured to control said second valve between said open and said closed state, said second switch being manually actuatable to manually initiate a burst of steam only through said milk frothing unit and out of said frothed milk dispensing spout for a variable amount of time to further purge said milk contacting surfaces of said brewed beverage appliance;

wherein both said first valve and said second valve are external to said venturi, avoiding any physical contact with said venturi body.

2. The brewed beverage appliance of claim 1, wherein:
said milk reservoir is removable from said brewed beverage appliance.

3. The brewed beverage appliance of claim 1, further comprising:
a knob electrically connected to the processor, the knob being manually actuatable to control said first and second valves to said open states to allow said milk and said steam to enter said milk frothing unit to produce frothed milk.

4. The brewed beverage appliance of claim 1, wherein:
said brewed beverage appliance is a single serve coffee maker.

5. A single serve coffee maker, comprising:
a housing;
a steam source;
a milk reservoir;
a venturi having a venturi body with a steam inlet end for receiving steam from said steam source within said housing via a steam line and a milk inlet opening for receiving milk from said milk reservoir via a milk delivery tube;
a frothed milk dispensing spout in fluid communication with said venturi;
a first solenoid valve in fluid communication with said milk delivery tube upstream of said milk inlet opening in said venturi body, wherein said first solenoid valve is configured to control a flow of milk through said milk inlet opening in the venturi body, and wherein said first solenoid valve is configurable between an open state and a closed state, said first solenoid valve controlling an ingress of the milk through said milk inlet opening in said venturi body when in said open state;
a second solenoid valve in fluid communication with the steam line upstream of said steam inlet end in said venturi body, wherein said second solenoid valve is configured to control a flow of steam through said steam inlet end in said venturi body and configurable between an open state and a closed state, said second solenoid valve controlling an ingress of steam through said steam inlet end in said venturi body when in said open state;
a processor electrically coupled to said first and second solenoid valves, said processor configured to control said first and second solenoid valves between said open and closed states; and
a switch electrically coupled to said processor and configured to control said second solenoid valve between said open and said closed state;

wherein said coffee maker is operable in an automatic mode of operation, whereby said processor automatically causes steam to travel within said venturi for a predetermined amount of time after a flow of milk through said venturi is ceased;

wherein said coffee maker is operable in a manual mode of operation, whereby said switch is manually activated to cause steam to travel within said venturi, and manually deactivated to cause steam to cease travel within said venturi;

wherein manually activating said switch and manually deactivating said switch in said manual mode of operation provide a variable amount of time that steam travels through said venturi; and wherein both said first solenoid valve and said second solenoid valve are external to said venturi, avoiding any physical contact with said venturi body.

6. A brewed beverage appliance, comprising:
a housing;
a steam source;
a milk reservoir;
a brewed beverage dispensing spout;
a frothed milk dispensing spout;
a milk frothing unit fluidly coupled to said frothed milk dispensing spout, said milk frothing unit including a venturi having a venturi body with a steam inlet end for receiving steam from said steam source within said housing via a steam line and a milk inlet opening for receiving milk from said milk reservoir via a milk delivery tube;
a first valve in fluid communication with said milk delivery tube upstream of said milk inlet opening in said venturi body, wherein said first valve is configured to control a flow of milk through said milk inlet opening in said venturi body, and wherein said first valve is controllable between an open state and a closed state to control a flow of milk to said milk frothing unit, said first valve controlling an ingress of the milk through said milk inlet opening in said venturi body when in said open state;
a second valve in fluid communication with the steam line upstream of said steam inlet end in said venturi body, wherein said second valve is configured to control a flow of steam through said steam inlet end in said venturi body and is controllable between an open state and a closed state to control a flow of steam to said milk frothing unit, said second valve controlling an ingress of steam through said steam inlet end in said venturi body when in said open state;
a processor electrically coupled to said first and second valves, said processor configured to control said first and second valves between said open and closed states automatically at an end of a brewing cycle to purge milk contacting surfaces of said brewed beverage appliance; and
a switch electrically coupled to said processor and configured to control said second valve between said open and said closed state, said switch being configured for manual activation and manual deactivation to manually provide a burst of steam only through said milk frothing unit and out of said frothed milk dispensing spout for a variable amount of time to further purge said milk contacting surfaces of said brewed beverage appliance;
wherein said processor is configured to control said first valve and said second valve to said open states to permit said flow of milk and said flow of steam into said milk frothing unit to produce frothed milk;

wherein said processor operates according to a control algorithm such that when a desired quantity of frothed milk is dispensed from said frothed milk dispensing spout, said first valve is controlled to said closed state and said second valve is maintained in said open state for a predetermined amount of time to cleanse said milk frothing unit and milk dispensing spout;

wherein said milk frothing unit includes a mechanism for varying a flow rate of said steam through said milk frothing unit; and wherein both said first valve and said second valve are external to said venturi, avoiding any physical contact with said venturi body.

* * * * *